US012803000B2

(12) United States Patent
Sun et al.

(10) Patent No.: US 12,803,000 B2
(45) Date of Patent: Nov. 17, 2026

(54) ELECTRODE PLATE, METHOD FOR PREPARING THE SAME AND LITHIUM-ION BATTERY

(71) Applicant: ZHUHAI COSMX BATTERY CO., LTD., Zhuhai (CN)

(72) Inventors: Leiming Sun, Zhuhai (CN); Jian Zhang, Zhuhai (CN); Shuanghu Zhang, Zhuhai (CN); Chong Peng, Zhuhai (CN)

(73) Assignee: ZHUHAI COSMX BATTERY CO., LTD., Zhuhai (CN)

( * ) Notice: Subject to any disclaimer, the term of this patent is extended or adjusted under 35 U.S.C. 154(b) by 784 days.

(21) Appl. No.: 18/146,308

(22) Filed: Dec. 23, 2022

(65) Prior Publication Data

US 2023/0125464 A1 Apr. 27, 2023

Related U.S. Application Data

(63) Continuation of application No. PCT/CN2021/142831, filed on Dec. 30, 2021.

(30) Foreign Application Priority Data

Dec. 30, 2020 (CN) ......................... 202011628654.0

(51) Int. Cl.

*H01M 4/62* (2006.01)
*H01M 4/02* (2006.01)
(Continued)

(52) U.S. Cl.

CPC ......... *H01M 4/625* (2013.01); *H01M 4/0404* (2013.01); *H01M 4/525* (2013.01); *H01M 10/0525* (2013.01); *H01M 2004/021* (2013.01)

(58) Field of Classification Search

None

See application file for complete search history.

(56) References Cited

U.S. PATENT DOCUMENTS

2014/0120417 A1 5/2014 Matsushita et al.
2018/0190963 A1* 7/2018 Guo .................... H01M 50/536
(Continued)

FOREIGN PATENT DOCUMENTS

CN 203150652 U 8/2013
CN 106229466 A 12/2016
(Continued)

OTHER PUBLICATIONS

Huang et al. A two layer electrode structure for improved Li Ion diffusion and volumetric capacity in Li Ion batteries, Nano Energy, vol. 31,2017, pp. 377-385, ISSN 2211-2855, https://doi.org/10.1016/j.nanoen.2016.11.043. (https://www.sciencedirect.com/science/article/pii/S2211285516305390) (Year: 2017).*
(Continued)

*Primary Examiner* — Ula C Ruddock
*Assistant Examiner* — Christina Renee Daulton
(74) *Attorney, Agent, or Firm* — Westbridge IP LLC

(57) ABSTRACT

An electrode plate includes a current collector, a first active layer, and a second active layer. The first active layer is disposed on a surface of the current collector and provided with a first groove, and the second active layer is divided into a first portion disposed in the first groove and a second portion disposed on a surface, away from the current collector, of the first active layer. The first portion is provided with a second groove, a tab is disposed at the second groove and is electrically connected to the current collector, and a thickness of the first portion of the second active layer is less than a total thickness of the first active layer and the second portion of the second active layer.

18 Claims, 3 Drawing Sheets

(51) Int. Cl.

| | |
|---|---|
| ***H01M 4/04*** | (2006.01) |
| ***H01M 4/525*** | (2010.01) |
| ***H01M 10/0525*** | (2010.01) |

(56) References Cited

U.S. PATENT DOCUMENTS

| | | | | |
|---|---|---|---|---|
| 2019/0288279 | A1* | 9/2019 | Xu | H01M 4/1393 |
| 2019/0288287 | A1* | 9/2019 | Uchida | H01M 4/622 |
| 2019/0312259 | A1* | 10/2019 | Baek | H01M 4/625 |
| 2020/0020921 | A1 | 1/2020 | Shiozaki et al. | |

FOREIGN PATENT DOCUMENTS

| | | | |
|---|---|---|---|
| CN | 103794749 | B | 4/2017 |
| CN | 109004170 | A | 12/2018 |
| CN | 109004175 | A | 12/2018 |
| CN | 109841794 | A | 6/2019 |
| CN | 109980177 | A | 7/2019 |
| CN | 110431692 | A | 11/2019 |
| CN | 111129502 | A | 5/2020 |
| CN | 111540879 | A | 8/2020 |
| CN | 111540880 | A | 8/2020 |
| CN | 111540881 | A | 8/2020 |
| CN | 111554878 | A | 8/2020 |
| CN | 211238371 | U | 8/2020 |
| CN | 111900328 | A | 11/2020 |
| CN | 111916666 | A | 11/2020 |
| CN | 111952541 | A | 11/2020 |
| CN | 111969214 | A | 11/2020 |
| CN | 112713259 | A | 4/2021 |
| CN | 112820852 | A | 5/2021 |
| CN | 214672685 | U | 11/2021 |
| CN | 112820852 | B | 4/2022 |
| JP | 2001243989 | A * | 9/2001 |
| JP | 2002151055 | A | 5/2002 |
| JP | 2010282873 | A | 12/2010 |
| JP | 2022151055 | A | 10/2022 |
| KR | 20150071453 | A | 6/2015 |
| KR | 20200100435 | A | 8/2020 |
| WO | 2013031213 | A1 | 3/2013 |
| WO | 2018179885 | A1 | 10/2018 |

OTHER PUBLICATIONS

International Search Report and Written Opinion issued in corresponding PCT Application No. PCT/CN2021/142831, dated Feb. 28, 2022.

Extended European Search Report issued in counterpart European Patent Application No. 21914590.1, dated Dec. 17, 2024.

Notice of Reasons for Refusal issued in counterpart Japanese Patent Application No. JP 2022-580864, dated Jan. 28, 2025.

Notice of Reasons for Refusal issued in counterpart Japanese Patent Application No. JP 2022-580864, dated Jul. 22, 2024.

Zhang, Comparison of current density at different tab positions, Simulation Test Report, dated Dec. 23, 2025.

Written Decision on Registration issued in counterpart Korean Patent Application No. KR 10-2023-7004963, dated Apr. 8, 2026.

Vivo Y52s Launch Time, Baidu Baike online encyclopedia entry, authenticated by Trusted Time Stamp Certification Certificate (No. TSA-02-20260309580490051) issued by China TSA Time-Stamp Service Center, Date first available on Dec. 12, 2020, retrieved from https://baike.baidu.com/link? url=wtzGzEbcjCf7mL64aF_6HKJWBjz163P1P5kOsci8gYFo60VPxjkwtG89_2FfyGftiayU2pPwXd2-V2iofKps1_on Mar. 9, 2026.

Vivo Y52s Launch Time, ZOL (Zhongguancun Online) webpage entry, authenticated by Trusted Time Stamp Certification Certificate (No. TSA-02-20260313676382674) issued by China TSA Time-Stamp Service Center, Date first available on Dec. 12, 2020, retrieved from https://detail.zol.com.cn/1351/1350608/param.shtml on Mar. 13, 2026.

Vivo Y52s today on sale 5000 mAh large battery thousand-yuan 5G mobile phone, Tencent. com online news article, authenticated by Trusted Time Stamp Certification Certificate (No. TSA-02-20260313676409895) issued by China TSA Time-Stamp Service Center, Date first available on Dec. 12, 2020, retrieved from https://news.qq.com/rain/a/20201212A04H1800?web_channel=wap&openApp=false&suid=&media_id= on Mar. 13, 2026.

1898 RMB! vivo Y52s on sale today: 5000mAh large battery + 48MP high-definition imaging, WeChat Official Account online article, authenticated by Trusted Time Stamp Certification Certificate (No. TSA-02-20260313676505826) issued by China TSA Time-Stamp Service Center, Date first available on Dec. 12, 2020, retrieved from https://mp.weixin. qq. com/s/kQtfalm3plz2b983qvO3Xg on Mar. 13, 2026.

Notarial Evidence Preservation Certificate No. (2026) Min Zheng Nei Zi No. 1569, Fuzhou Minjiang Notary Office, documenting purchase, receipt, store testing and sealing of vivo Y52s 8G+128G mobile phone via Zhuanzhuan APP, retrieved from notarial file, issued for Ningde New Energy Technology Co., Ltd. and Dongguan New Energy Technology Co., Ltd. on Feb. 13, 2026.

Notarial Evidence Preservation Certificate No. (2026) Min Zheng Nei Zi No. 1572, Fuzhou Minjiang Notary Office, documenting purchase, receipt and sealing of vivo Y52s 8+128GB mobile phone via Xianyu (Idle Fish) APP, retrieved from notarial file, issued for Ningde New Energy Technology Co., Ltd. and Dongguan New Energy Technology Co., Ltd. on Feb. 13, 2026.

Notarial Evidence Preservation Certificate No. (2026) Min Zheng Nei Zi No. 1840, Fuzhou Minjiang Notary Office, documenting store-testing and re-sealing of the vivo Y52s mobile phone previously sealed under Notarial Certificate (2026) Min Zheng Nei Zi No. 1572, retrieved from notarial file, issued for Ningde New Energy Technology Co., Ltd. and Dongguan New Energy Technology Co., Ltd. on Mar. 2, 2026.

Test Report No. CTIESTAC260128, Tianmu Lake Advanced Energy Storage Technology Research Institute Co., Ltd., documenting disassembly and electrode-coating material characterization analysis of battery disassembled from vivo Y52s mobile-phone previously sealed under Notarial Certificate (2026) Min Zheng Nei Zi No. 1840, retrieved from test-report file, on Mar. 14, 2026.

Intellectual Property Forensic Opinion No. Hu Ke Jian [2025] He Jian Zi No. 0807, Shanghai Kejian Intellectual Property Service Co., Ltd., documenting technical-feature comparison forensic analysis on lithium-ion battery model 476588C, retrieved from forensic-opinion file, on Feb. 6, 2026.

* cited by examiner

ELECTRODE PLATE, METHOD FOR PREPARING THE SAME AND LITHIUM-ION BATTERY

CROSS-REFERENCE TO RELATED APPLICATIONS

This application is a continuation application of International Application No. PCT/CN2021/142831, filed on Dec. 30, 2021, which claims priority to Chinese Patent Application No. 202011628654.0, filed with the China National Intellectual Property Administration on Dec. 30, 2020 and entitled "ELECTRODE PLATE AND LITHIUM-ION BATTERY". Both of the aforementioned applications are hereby incorporated by reference in their entireties.

TECHNICAL FIELD

The present disclosure relates to the field of lithium-ion battery technologies, and in particular to an electrode plate, a method for preparing the same and a lithium-ion battery.

BACKGROUND

With the advent of the 5G era, lithium-ion batteries have become increasingly important. The lithium-ion batteries are currently developing in a direction of high energy density and high fast charging rate. Currently, a connection position of a tab is adjusted from the edge of an electrode plate to the middle position of a side of the electrode plate, to reduce impedance of a lithium-ion battery.

However, when the position of the tab is changed, current density around the tab is increased, and with cycle of the lithium-ion battery, lithium ions are precipitated, resulting in deterioration of cycling performance of the lithium-ion battery. Therefore, increasing attention has been paid to how to resolve problems of deterioration of cycling performance of a lithium-ion battery caused by such a tab connection manner.

SUMMARY

The present disclosure provides an electrode plate to resolve problems of deterioration of cycling performance of a lithium-ion battery caused by such a tab connection manner.

According to a first aspect of the present disclosure, an electrode plate is provided. The electrode plate includes a current collector, a first active layer, and a second active layer. The first active layer is disposed on a surface of the current collector and provided with a first groove, and the second active layer is divided into a first portion disposed in the first groove and a second portion disposed on a surface, away from the current collector, of the first active layer. The first portion is provided with a second groove, a tab is disposed at the second groove and is electrically connected to the current collector, and a thickness of the first portion of the second active layer is less than a total thickness of the first active layer and the second portion of the second active layer.

According to a second aspect of the present disclosure, a lithium-ion battery is provided, and the lithium-ion battery includes any one of the foregoing electrode plates.

The present disclosure provides an electrode plate, and a person skilled in the art, on the basis of the electrode plate provided in the present disclosure, may prepare a lithium-ion battery in combination with the conventional technology. The lithium-ion battery provided in the present disclosure has good cycling performance.

Embodiments of the present application have at least the following advantages.

1. According to the electrode plate provided in the present disclosure, the thickness of the portion of the active layer near the tab is reduced, avoiding a charging risk at a connection position of the tab to a specific extent and improving cycling performance of a lithium-ion battery.
2. The electrode plate provided in the present disclosure is applicable to both a positive electrode plate and a negative electrode plate.
3. When the electrode plate is a positive electrode plate, the electrode plate structure provided in the present disclosure may be used to avoid problems that the tab cannot be connected to the middle position of the side surface of the current collector due to presence of the high-viscosity substance in the first active layer.
4. The lithium-ion battery provided in the present disclosure has good cycling performance.

DETAILED DESCRIPTION OF THE EMBODIMENTS

To make the objectives, technical solutions, and advantages of the present disclosure clearer, the following clearly describes the technical solutions in embodiments of the present disclosure with reference to the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1A:
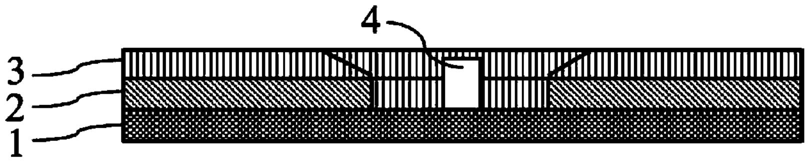
FIG. 1A is a front view of an electrode plate according to an embodiment of the present disclosure.
Figure 1B:
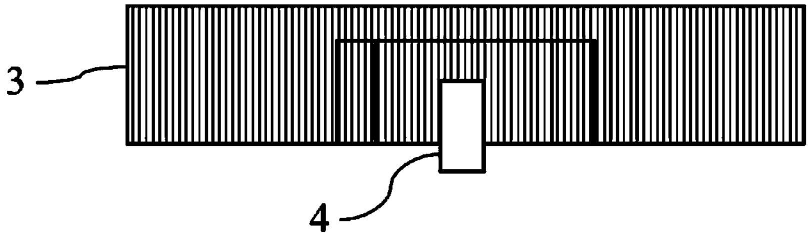
FIG. 1B is a top view of an electrode plate according to an embodiment of the present disclosure.
Figure 1C:
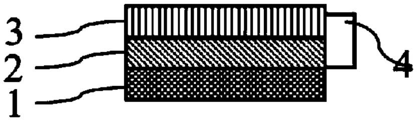
FIG. 1C is a left view of an electrode plate according to an embodiment of the present disclosure.

Currently, an electrode plate used in the conventional technology generally includes a current collector and an active layer disposed on a surface of the current collector, and a groove is formed in the middle of a side of the active layer. The groove is connected to a tab in a corresponding region on the current collector. In order to resolve the problem of deterioration of cycling performance of a lithium-ion battery caused by such a tab connection manner, a thickness of a portion of the active layer around the tab is reduced in the present disclosure. Specifically, FIG. 1A is a front view of an electrode plate according to an embodiment of the present disclosure, FIG. 1B is a top view of an electrode plate according to an embodiment of the present disclosure, and FIG. 1C is a left view of an electrode plate according to an embodiment of the present disclosure. As shown in FIG. 1A to FIG. 1C, the electrode plate includes a current collector 1, a first active layer 2, a second active layer 3, and a tab 4. The first active layer 2 is disposed on a surface of the current collector 1, and the first active layer 2 is provided with a first groove. A first portion of the second active layer is disposed in the first groove and in contact with the surface of the current collector 1, and a second portion of the second active layer is disposed on an upper surface, away from the current collector 1, of the first active layer 2. A second groove is provided in the middle of a side of the first portion of the second active layer, and the tab 4 is connected to the current collector 1 through the second groove. A thickness of the first portion of the second active layer is less than a total thickness of the first active layer and the second portion of the second active layer, such that a thickness of the portion of the active layer close to the tab is less than a thickness of the portion of the active layer away from the tab region. A definition of the thickness of the electrode plate in the present application is the same as that in the conventional technology, that is, the longest side of the electrode plate is the length of the electrode plate, the shortest side of the electrode plate is the height of the electrode plate, and a side between the longest side and the shortest side is the width of the electrode plate. That is, in FIG. 1A, a longer side is the length of the electrode plate, and a shorter side is the height of the electrode plate; and in FIG. 1B, a shorter side is the width of the electrode plate. A value of the longer side is the length of the electrode plate, a value of the higher side is the thickness of the electrode plate, and a value of the wider side is the width of the electrode plate. In addition, a length direction, width direction, and thickness direction of the first groove and the second groove are defined as the same as that of the electrode plate. According to the electrode plate provided in the present disclosure, a total thickness of the portion of the active layer around a tab is reduced, reducing a charging risk at a connection position of the tab to a specific extent and improving cycling performance of a lithium-ion battery.

In an embodiment, in order to further improve cycling performance of a lithium-ion battery, a thickness of the first active layer should be appropriately reduced, that is, a thickness of the second active layer is greater than a thickness of the first active layer. In addition, since being disposed in the first groove, the first portion of the second active layer is subjected to less force in a subsequent electrode plate rolling process, thus causing a difference in thicknesses of the first portion and the second portion of the second active layer. Specifically, the thickness of the first portion of the second active layer is greater than the thickness of the second portion.

According to the electrode plate structure shown in FIG. 1A to FIG. 1C, the conventional coating device needs to be improved so as to ensure a position and an area of the first groove, which not only increases preparation costs, but also is not conducive to preparation of other electrode plate structures. Therefore, the width of the first groove may be increased so that the width of the first groove is the same as that of the current collector. That is, the first groove divides the first active layer into two separate portions, and the middle blank portion is the first groove. An example is as follows.

Figure 2A:
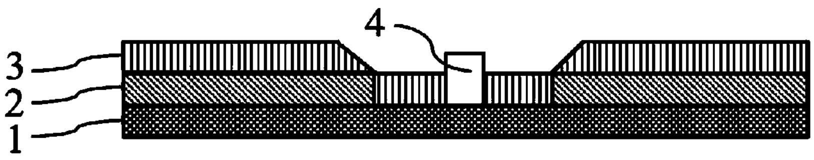
FIG. 2A is a front view of an electrode plate according to another embodiment of the present disclosure.
Figure 2B:
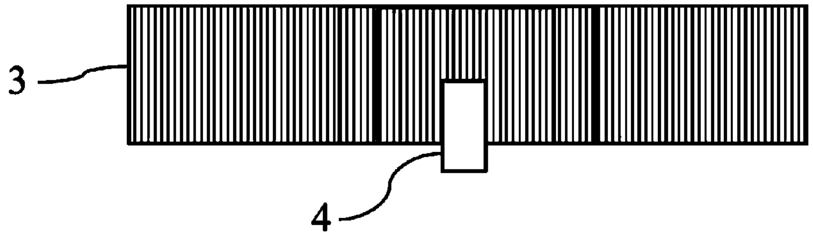
FIG. 2B is a top view of an electrode plate according to another embodiment of the present disclosure.

FIG. 2A is a front view of an electrode plate according to another embodiment of the present disclosure, and FIG. 2B is a top view of an electrode plate according to another embodiment of the present disclosure. As shown in FIG. 2A and FIG. 2B, the electrode plate includes a current collector 1, a first active layer 2, a second active layer 3, and a tab 4. The first active layer 2 is provided with a first groove, and a width of the first groove is the same as a width of the current collector 1. That is, the first groove divides the first active layer 2 into left and right portions, a first portion of the second active layer 3 is disposed in the first groove, and a second portion of the second active layer 3 is disposed on an upper surface, away from the current collector 1, of the first active layer 2. Since the width of the first groove is the same as the width of the current collector, the second portion of the second active layer 3 is also divided into left and right separate portions.

It may be appreciated that an intersection of the diagonal lines of a vertical projected region of the second groove on the current collector is used as the center, and the center of the vertical projection region of the second groove on the current collector is located within the first groove.

Further referring to FIG. 1B or FIG. 2B, it may be learned that the center of the vertical projection region of the second groove on the current collector is located within the first groove. In order to further improve cycling performance of a lithium-ion battery, the second groove may be disposed in the center of the first groove as much as possible, so that portions of the active layer on both sides of the tab have the same thickness.

An area ratio of the first groove to the second groove on a cross section in a length direction has a greater impact on performance of a lithium-ion battery. Specifically, a vertical projected area of the second groove on the current collector ranges from 1% to 50% of a vertical projected area of the first groove on the current collector. In a specific preparation process, a person skilled in the art may determine widths of the first groove and the second groove, and adjust the area ratio of the first groove and the second groove by adjusting length ranges thereof.

In order to improve fast charging performance of a lithium-ion battery, when the electrode plate is a negative electrode plate, an average particle size of an active substance in the second active layer ranges from 5 μm to 20 μm and a degree of graphitization of the active substance in the second active layer ranges from 90% to 98%.

The electrode plate provided in the present disclosure is also applicable to a positive electrode plate, and when the electrode plate is a positive electrode plate, a material of the first active layer generally uses a high-viscosity substance to improve safety performance of a lithium-ion battery. However, because viscosity of the high-viscosity substance is high, during cleaning of a region where the first groove is located in the first active layer, the high-viscosity substance cannot be thoroughly cleaned, and thus there is the high-viscosity substance residue in a corresponding region of the first groove, affecting connection between the tab and the current collector and causing the tab to fail to be connected to the middle position of a side surface of the current collector. Therefore, use of the electrode plate structure provided in the present disclosure may effectively avoid the problems that the tab cannot be connected to the middle position of the side surface of the current collector due to presence of the high-viscosity substance in the first active layer, that is, the first active layer uses the high-viscosity substance, and subsequently only the second active layer needs to be cleaned without cleaning the first active layer. Specifically, the high-viscosity substance refers to a binder in an active layer material having a molecular weight ranging from 800000 to 2000000, and a mass of the binder ranges from 3% to 40% of a total mass of the first active layer.

In addition, the thickness of the first active layer and the second active layer in the electrode plate has a great impact on performance of a lithium-ion battery. The inventors of the present application found through research that, when a thickness ratio of the first active layer increases, cycling performance of a lithium-ion battery decreases moderately. Therefore, the thickness of the first active layer ranges from 5% to 80% of the total thickness of the first active layer and the second portion of the second active layer.

Figure 3:
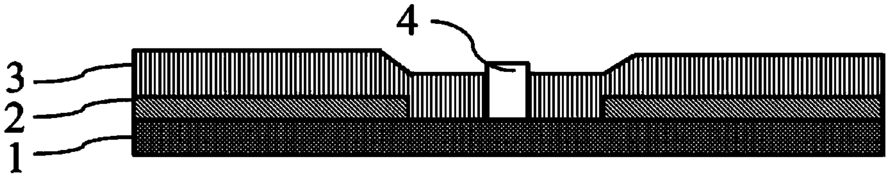
FIG. 3 is a front view of an electrode plate according to yet another embodiment of the present disclosure.

When the electrode plate is a positive electrode plate, the thickness of the first active layer should be appropriately reduced. For example, FIG. 3 is a front view of a positive electrode plate according to an embodiment of the present disclosure. As shown in FIG. 3, when the electrode plate is a positive electrode plate, the thickness of the first portion of the second active layer is higher than that of the first active layer.

On the basis of the electrode plate structure provided in the present disclosure, a person skilled in the art may prepare an electrode plate in combination with an existing electrode plate preparation method. Specifically, first active layer slurry and second active layer slurry are prepared first. Next, the prepared first active layer slurry is coated on a surface of a current collector, and blank coating is performed on a region corresponding to the first groove to obtain a first active layer provided with a first groove, and then the second active layer slurry is coated according to a conventional electrode plate coating process. Part of the second active layer slurry is filled in the first groove under the action of gravity to obtain a first portion of a second active layer, and a second portion of the second active layer is obtained based on the remaining part of the second active layer slurry. Finally, an active layer located in part of the first portion in the first groove is cleaned to obtain a second groove, and a tab is disposed in the second groove and electrically connected to the current collector, to obtain the electrode plate.

A person skilled in the art may select materials of the positive electrode plate and the negative electrode plate in combination with the conventional technology. For example, when the electrode plate is a positive electrode plate, the current collector may be aluminum foil, and a positive electrode active substance includes at least one of lithium cobalt oxide, lithium manganate, lithium nickelate, lithium nickel cobalt manganate, lithium iron phosphate, lithium iron manganese phosphate, lithium vanadium phosphate, lithium vanadyl phosphate, a lithium-rich manganese-based material, and lithium nickel cobalt aluminate.

When the electrode plate is a negative electrode plate, the current collector may be copper foil, and a negative electrode active material includes at least one of artificial graphite, natural graphite, and modified graphite.

The positive electrode plate and the negative electrode plate use a same binder and a same conductive agent. Specifically, the binder may be made of at least one of polyvinylidene fluoride (PVDF), a vinylidene fluoride-hexafluoropropylene copolymer, polyamide, polyacrylonitrile, polyacrylate, polyacrylic acid, polyacrylate, polyvinyl pyrrolidone, polyvinyl ether, polymethyl methacrylate, polytetrafluoroethylene, polyhexafluoropropylene, and styrene-butadiene rubber (SBR). The conductive agent may be made of at least one of conductive carbon black, a carbon nanotube, conductive graphite, and graphene. The negative electrode plate may further include a thickener, and the thickener may be made of sodium carboxymethyl cellulose.

It may be appreciated that the second groove is used to dispose the tab, so that the width of the second groove is less than the width of the first groove in a width direction of the current collector.

In an actual preparing process, in order to facilitate connection between the tab and the current collector, the vertical projected area of the second groove on the current collector may be increased, so that the vertical projected area of the second groove on the current collector is larger than an area of a tab connection region on the current collector.

Figure 4:
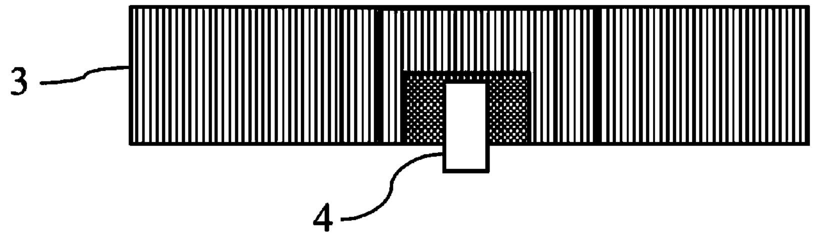
FIG. 4 is a top view of an electrode plate according to yet another embodiment of the present disclosure.

FIG. 4 is a top view of an electrode plate according to yet another embodiment of the present disclosure. As shown in FIG. 4, both a length and a width of the first groove are greater than that of the tab connection region on the current collector, so as to facilitate connection of the tab 4 to the current collector 1.

Further, a width of the second groove is 1 to 2 times a width of the tab connection region, and a length of the second groove is 1 to 2 times a length of the tab connection region.

In conclusion, according to the electrode plate provided in the present disclosure, a thickness of the portion of an active layer around the tab is reduced, avoiding a charging risk at a connection position of the tab to a specific extent and improving cycling performance of a lithium-ion battery.

Embodiment 1

An electrode plate provided in this embodiment is a positive electrode plate. A front view of a structure of the electrode plate is shown in FIG. 3, a top view of a structure of the electrode plate is shown in FIG. 4, and a left view of a structure of the electrode plate is shown in FIG. 1C.

A current collector is aluminum foil, with a width of 79 mm.

A first groove has a width of 79 mm and a length of 15 mm.

A second groove has a width of 25 mm and a length of 10 mm.

A thickness of a first active layer is 10 μm, and a thickness of a second active layer is 80 μm.

A material used for the first active layer is a high-viscosity substance including lithium cobaltate, conductive carbon, and polyvinylidene fluoride. A molecular mass of the polyvinylidene fluoride is 800000, and a mass of the polyvinylidene fluoride is 20% of a total mass of the first active layer.

Embodiment 2

An electrode plate provided in this embodiment is a negative electrode plate. A front view of a structure of the electrode plate is shown in FIG. 2A, a top view of a structure of the electrode plate is shown in FIG. 4, and a left view of a structure of the electrode plate is shown in FIG. 1C.

A current collector is copper foil, with a width of 81 mm.

A first groove has a width of 81 mm and a length of 50 mm.

A second groove has a width of 25 mm and a length of 10 mm.

A thickness of a first active layer is 50 μm, and a thickness of a second active layer is 50 μm.

An active substance used for the second active layer is graphite, and the graphite has an average particle size of 15 μm and a degree of graphitization of 94%.

Embodiment 3

An electrode plate provided in this embodiment is a negative electrode plate. A front view of a structure of the electrode plate is shown in FIG. 3, a top view of a structure of the electrode plate is shown in FIG. 4, and a left view of a structure of the electrode plate is shown in FIG. 1C.

A current collector is copper foil, with a width of 81 mm.

A first groove has a width of 81 mm and a length of 50 mm.

A second groove has a width of 25 mm and a length of 10 mm.

A thickness of a first active layer is 30 μm, and a thickness of a second active layer is 70 μm.

An active substance used for the second active layer is graphite, and the graphite has an average particle size of 15 μm and a degree of graphitization of 94%.

Embodiment 4

An electrode plate provided in this embodiment is a negative electrode plate. A front view of a structure of the electrode plate is shown in FIG. 3, a top view of a structure of the electrode plate is shown in FIG. 4, and a left view of a structure of the electrode plate is shown in FIG. 1C.

A current collector is copper foil, with a width of 81 mm.

A first groove has a width of 81 mm and a length of 50 mm.

A second groove has a width of 25 mm and a length of 10 mm.

A thickness of a first active layer is 40 μm, and a thickness of a second active layer is 60 μm.

An active substance used for the second active layer is graphite, and the graphite has an average particle size of 15 μm and a degree of graphitization of 94%.

Embodiment 5

An electrode plate provided in this embodiment is a negative electrode plate. A front view of a structure of the electrode plate is shown in FIG. 2A, a top view of a structure of the electrode plate is shown in FIG. 4, and a left view of a structure of the electrode plate is shown in FIG. 1C.

A current collector is copper foil, with a width of 81 mm.

A first groove has a width of 81 mm and a length of 50 mm.

A second groove has a width of 25 mm and a length of 10 mm.

A thickness of a first active layer is 50 μm, and a thickness of a second active layer is 50 μm.

An active substance used for the second active layer is graphite, and the graphite has an average particle size of 10 μm and a degree of graphitization of 92%.

Embodiment 6

An electrode plate provided in this embodiment is a negative electrode plate. A front view of a structure of the electrode plate is shown in FIG. 2A, a top view of a structure of the electrode plate is shown in FIG. 4, and a left view of a structure of the electrode plate is shown in FIG. 1C.

A current collector is copper foil, with a width of 81 mm.

A first groove has a width of 81 mm and a length of 50 mm.

A second groove has a width of 25 mm and a length of 10 mm.

A thickness of a first active layer is 50 μm, and a thickness of a second active layer is 50 μm.

An active substance used for the second active layer is graphite, and the graphite has an average particle size of 10 μm and a degree of graphitization of 95%.

Embodiment 7

An electrode plate provided in this embodiment is a negative electrode plate. A front view of a structure of the electrode plate is shown in FIG. 2A, a top view of a structure of the electrode plate is shown in FIG. 4, and a left view of a structure of the electrode plate is shown in FIG. 1C.

A current collector is copper foil, with a width of 81 mm.

A first groove has a width of 81 mm and a length of 50 mm.

A second groove has a width of 25 mm and a length of 10 mm.

A thickness of a first active layer is 50 μm, and a thickness of a second active layer is 50 μm.

An active substance used for the second active layer is graphite, and the graphite has an average particle size of 15 μm and a degree of graphitization of 92%.

Embodiment 8

An electrode plate provided in this embodiment is a negative electrode plate. A front view of a structure of the electrode plate is shown in FIG. 2A, a top view of a structure of the electrode plate is shown in FIG. 4, and a left view of a structure of the electrode plate is shown in FIG. 1C.

A current collector is copper foil, with a width of 81 mm.

A first groove has a width of 81 mm and a length of 50 mm.

A second groove has a width of 25 mm and a length of 10 mm.

A thickness of a first active layer is 50 μm, and a thickness of a second active layer is 50 μm.

An active substance used for the second active layer is graphite, and the graphite has an average particle size of 15 μm and a degree of graphitization of 95%.

Comparative Embodiment 1

An electrode plate provided in this comparative embodiment is a positive electrode plate including a current collector and an active layer disposed on a surface of the current collector, and a tab is connected to the outermost edge side of the current collector.

The current collector is aluminum foil, with a width of 79 mm.

A thickness of the active layer is 90 μm.

Comparative Embodiment 2

An electrode plate provided in the present comparative embodiment is a negative electrode plate including a current collector, a first active layer and a second active layer, and the first active layer and the second active layer are disposed on a surface of the current collector. A groove is disposed at a middle position of a side surface of each of the first active layer and the second active layer, and a tab is connected to the current collector in the groove.

The current collector is copper foil, with a width of 81 mm.

A groove has a width of 25 mm and a length of 10 mm.

A total thickness of the first active layer and the second active layer is 100 μm.

On the basis of the electrode plates provided in Embodiments 1 to 8 and Comparative Embodiments 1 and 2 of the present disclosure, a lithium-ion battery was prepared with a negative electrode plate/positive electrode plate having a same structure, a separator and an electrolyte. For example, a positive electrode plate is provided in Embodiment 1 and Comparative Embodiment 1, and thus a structure of the corresponding negative electrode plate is the same as that of the positive electrode plate. A negative electrode plate is provided in Embodiments 2 to 8 and Comparative Embodiment 2, and thus a structure of the corresponding positive electrode plate is the same as that of the negative electrode plate. In addition, cycling performance of the lithium-ion battery was tested.

The positive electrode material is purchased from XTC New Energy Materials (Xiamen) Co., Ltd., the negative electrode material is purchased from Shanghai Shanshan Technology Co., Ltd., the separator is purchased from Dongguan Advanced Electronic Technology Co., Ltd., and the electrolyte is purchased from Shenzhen Capchem Technology Co., Ltd.

Method for Testing Performance of the Lithium-Ion Battery is as Follows

The lithium-ion batteries prepared on the basis of Embodiment 1 and Comparative Embodiment 1 were subjected to a charge/discharge cycle test of 2 C/0.7 C at 25° C. and cycle retentions (%) were calculated. A cell surface temperature was monitored with a temperature sensor, and a difference between a maximum temperature value and an initial temperature value was recorded as a temperature rise (° C.) for each lithium-ion battery. The test results are shown in Table 1.

The lithium-ion batteries prepared on the basis of Embodiments 2 to 8 and Comparative Embodiment 2 were subjected to a charge/discharge cycle test of 2 C/0.7 C at 25° C./10° C. and cycle retentions (%) were calculated, respectively. The test results are shown in Table 2.

TABLE 1

Performance test results of lithium-ion batteries provided in Embodiment 1 and Comparative Embodiment 1

| | Cycle retention at 25° C. | Cell surface temperature rise |
|---|---|---|
| Embodiment 1 | 84.80% | 13° C. |
| Comparative Embodiment 1 | 83.90% | 16° C. |

TABLE 2

Cycling performance test results of lithium-ion batteries provided in Embodiments 2 to 8 and Comparative Embodiment 2

| | Cycle retention at 25° C. | Cycle retention at 10° C. |
|---|---|---|
| Embodiment 2 | 85.10% | 83.00% |
| Embodiment 3 | 86.10% | 84.00% |
| Embodiment 4 | 85.50% | 83.00% |
| Embodiment 5 | 86.00% | 84.50% |
| Embodiment 6 | 84.90% | 83.30% |
| Embodiment 7 | 85.30% | 83.50% |
| Embodiment 8 | 83.00% | 82.60% |
| Comparative Embodiment 2 | 82.00% | 81.00% |

As can be learned from Table 1 and Table 2, the lithium-ion batteries provided in Embodiments 1-8 all have good cycling performance. According to the data provided in Embodiments 2 to 4, as a ratio of a thickness of a first active layer to a total thickness of an active layer is increased, performance of a lithium-ion battery is moderately degraded, so that the thickness of the first active layer should be under controlled. According to the data provided in Embodiments 5 to 8, in a negative electrode plate, as an average particle size and a degree of graphitization of a negative electrode active substance in a second active layer are increased, a cycle retention of a lithium-ion battery is decreased.

Finally, it should be noted that the foregoing embodiments are merely intended to describe the technical solutions of the present disclosure, but not intended to constitute any limitation. Although the present disclosure is described in detail with reference to the foregoing embodiments, persons of ordinary skill in the art should understand that they may still make modifications to the technical solutions described in the foregoing embodiments or make equivalent replacements to some or all technical features thereof; and these modifications or replacements do not make the essence of the corresponding technical solution depart from the scope of the technical solutions of the embodiments of the present disclosure.

What is claimed is:

1. An electrode plate, comprising a current collector, a first active layer, and a second active layer, wherein the first active layer is disposed on a surface of the current collector and provided with a first groove, and the second active layer is divided into a first portion disposed in the first groove and a second portion disposed on a surface, away from the current collector, of the first active layer; and the first portion is provided with a second groove, a tab is disposed at the second groove and is electrically connected to the current collector, a thickness of the first portion of the second active layer is less than a total thickness of the first active layer and the second portion of the second active layer, and a thickness of the first portion is greater than or equal to a thickness of the first active layer; a vertical projected area of the second groove on the current collector ranges from 1% to 50% of a vertical projected area of the first groove on the current collector; and a thickness of the first active layer ranges from 5% to 80% of the total thickness of the first active layer and the second portion of the second active layer.

2. The electrode plate according to claim 1, wherein a thickness of the second active layer is greater than a thickness of the first active layer; and/or the thickness of the first portion of the second active layer is greater than a thickness of the second portion.

3. The electrode plate according to claim 1, wherein a width of the first groove is the same as a width of the current collector.

4. The electrode plate according to claim 1, wherein a center of a vertical projection region of the second groove on the current collector is located within the first groove.

5. The electrode plate according to claim 1, wherein the electrode plate is a negative electrode plate, and a negative electrode active substance in the second active layer has an average particle size ranging from 5 μm to 20 μm, and a degree of graphitization ranging from 90% to 98%.

6. The electrode plate according to claim 1, wherein the electrode plate is a positive electrode plate, a molecular mass of a binder in the first active layer ranges from 800000 to 2000000, and a mass of the binder ranges from 3% to 40% of a total mass of the first active layer.

7. The electrode plate according to claim 1, wherein a width of the second groove is 1 to 2 times a width of a tab connection region, and a length of the second groove is 1 to 2 times a length of the tab connection region.

8. A lithium-ion battery, comprising an electrode plate, wherein the electrode plate comprises a current collector, a first active layer, and a second active layer, wherein the first active layer is disposed on a surface of the current collector and provided with a first groove, and the second active layer is divided into a first portion disposed in the first groove and a second portion disposed on a surface, away from the current collector, of the first active layer; and the first portion is provided with a second groove, a tab is disposed at the second groove and is electrically connected to the current collector, a thickness of the first portion of the second active layer is less than a total thickness of the first active layer and the second portion of the second active layer, and a thickness of the first portion is greater than or equal to a thickness of the first active layer; a vertical projected area of the second groove on the current collector ranges from 1% to 50% of a vertical projected area of the first groove on the current collector; and a thickness of the first active layer ranges from 5% to 80% of the total thickness of the first active layer and the second portion of the second active layer.

9. The lithium-ion battery according to claim 8, wherein a thickness of the second active layer is greater than a thickness of the first active layer; and/or the thickness of the first portion of the second active layer is greater than a thickness of the second portion.

10. The lithium-ion battery according to claim 8, wherein a width of the first groove is the same as a width of the current collector.

11. The lithium-ion battery according to claim 8, wherein the electrode plate is a negative electrode plate, and a negative electrode active substance in the second active layer has an average particle size ranging from 5 μm to 20 μm, and a degree of graphitization ranging from 90% to 98%.

12. The lithium-ion battery according to claim 8, wherein the electrode plate is a positive electrode plate, a molecular mass of a binder in the first active layer ranges from 800000 to 2000000, and a mass of the binder ranges from 3% to 40% of a total mass of the first active layer.

13. The lithium-ion battery according to claim 8, wherein a width of the second groove is 1 to 2 times a width of a tab connection region, and a length of the second groove is 1 to 2 times a length of the tab connection region.

14. A method for preparing an electrode plate, comprising:

coating first active layer slurry on a surface of a region, except a region corresponding to a first groove, of a current collector, to obtain a first active layer provided with the first groove;

coating second active layer slurry to obtain a first portion and a second portion of a second active layer, the first portion being formed in the first groove, the second portion covering a surface, away from the current collector, of the first active layer;

cleaning some regions in the first groove to obtain a second groove; and disposing a tab in the second groove, so that the tab is electrically connected to the current collector, wherein a thickness of the first portion of the second active layer is less than a total thickness of the first active layer and the second portion of the second active layer, and a thickness of the first portion is greater than or equal to a thickness of the first active layer; a vertical projected area of the second groove on the current collector ranges from 1% to 50% of a vertical projected area of the first groove on the current collector; and a thickness of the first active layer ranges from 5% to 80% of the total thickness of the first active layer and the second portion of the second active layer.

15. The electrode plate according to claim 1, wherein both the first active layer and the second active layer contain an active material; and the first portion is in contact with a surface of the current collector.

16. The lithium-ion battery according to claim 8, wherein both the first active layer and the second active layer contain an active material; the first portion is in contact with a surface of the current collector.

17. The electrode plate according to claim 1, wherein the first groove has a width of 79 mm or 81 mm, and a length of 15 mm or 50 mm; the second groove has a width of 25 mm and a length of 10 mm; the first active layer has a thickness of 10 μm, 30 μm, 40 μm or 50 μm; and the second active layer has a thickness of 50 μm, 60 μm, 70 μm or 80 μm.

18. The electrode plate according to claim 1, wherein the first groove has a width of 79 mm to 81 mm, and a length of 15 mm to 50 mm; the second groove has a width of 25 mm and a length of 10 mm; the first active layer has a thickness of 10 μm to 50 μm; and the second active layer has a thickness of 50 μm to 80 μm.

* * * * *